United States Patent
Campbell et al.

(10) Patent No.: US 6,275,300 B1
(45) Date of Patent: Aug. 14, 2001

(54) SIMPLIFIED METHOD TO PRINT INHERITED PAGES IN A PAGE PRINTER

(75) Inventors: Russell Campbell; Ted E. Dennler, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/524,264

(22) Filed: Mar. 13, 2000

Related U.S. Application Data

(63) Continuation of application No. 08/965,499, filed on Nov. 6, 1997, now Pat. No. 6,160,632.

(51) Int. Cl.$^7$ .................................................. G06K 15/00
(52) U.S. Cl. ........................................ 358/1.17; 358/1.16
(58) Field of Search ................................ 358/1.1, 1.15, 358/1.16, 1.17, 1.18, 1.9, 1.2, 404, 444, 450, 452, 462, 467; 345/191, 202, 523, 525; 382/180, 232, 233, 235, 276, 284, 293, 294, 303, 304

(56) References Cited

U.S. PATENT DOCUMENTS

| | | | |
|---|---|---|---|
| 5,104,245 | 4/1992 | Oguri et al. | 400/68 |
| 5,751,924 | 5/1998 | Hamada et al. | 395/115 |
| 5,859,954 | 1/1999 | Toda | 395/102 |
| 6,160,632 | * 12/2000 | Campbell et al. | 358/1.17 |

FOREIGN PATENT DOCUMENTS

| | | | |
|---|---|---|---|
| 0130287 | 1/1985 | (EP) | G06F/3/153 |
| 0131966 | 1/1985 | (EP) | G06F/3/12 |
| 0422688A1 | 4/1991 | (EP) | H04N/1/46 |
| 2219114A | 11/1989 | (GB) | G06F/3/12 |

* cited by examiner

Primary Examiner—Arthur G. Evans

(57) ABSTRACT

A system and method produce a combined page having all of the composition of a first page plus all of the composition of a second page. Each band of the first page is pre-rasterized then saved to solitary band stores. Next each band of the second page is pre-rasterized and combined with the corresponding solitary band store to produce combined band stores. The combined band stores are then joined to produce the combined page. The combined band stores are joined by printing each combined band store in sequential location on the same page.

14 Claims, 4 Drawing Sheets

SIMPLIFIED METHOD TO PRINT INHERITED PAGES IN A PAGE PRINTER

CROSS REFERENCE TO RELATED APPLICATION(S)

This is a continuation of application Ser. No. 08/965,499 filed on Nov. 6, 1997, now U.S. Pat. No. 6,160,632.

FIELD OF THE INVENTION

This invention relates in general to image transfer devices and, more particularly, to producing a combined page having all of the composition of a first page plus all of the composition of a second page.

BACKGROUND OF THE INVENTION

The Post-Script "copypage" operator causes the current page to be printed, then starts the next page with the same contents and composition state. The composition of the next page can continue normally or can close at any time, so the next page is the sum of all the postscript composition for both pages.

The "copypage" functionality is required for a complete emulation of the Post-Script language. The main utility for this operator is passing standardized Post-Script test packages. This copypage feature is also useful for debugging drivers and custom applications because this operator may be inserted at strategic points to isolate problems.

Previously, there were several different methods to accomplish Post-Script copypage functionality. These methods tended to be more complex to design, implement, and test than the value of the copypage feature. In some cases the implementation would not work for extensions such as duplexing.

In one Post-Script implementation, the method was to insert a special mark into the Display List when the copypage was parsed by the Post-Script Parser. The Display List was used with both the original and the next page. The difference was that rendering for the original page exited when the special mark was found, while it continued on for the next page. At first glance this approach seems simple. However, it requires sharing a resource between pages that was normally bound to one page. The implementation for this unnatural act required a considerable amount of complexity in design and implementation.

For example, consumable objects such as raster patches that normally had a one page lifetime required indeterminate lifetimes of two or more pages. This approach required reprocessing of the display lists and/or the use of reference counts on patches. A symptom that the single shared display lists were overly simplified was that the method broke down for duplex pages.

Another previous method for the implementation of copypage was to create and save a separate Display List copy for the next page, print the current page with the current Display List, then restore the saved Display List copy to continue the next page. This method also required substantial complexity to handle single-page consumable items such as raster graphics on multiple pages.

Both methods also required substantial complexity in order to synchronize caches such as the font cache. Adjustments for lifetimes had to be made that would manage lifetimes for the extra pages. In the first method discussed, the Display List must be parsed to determine the current characters and/or the font cache must be parsed and updated.

SUMMARY OF THE INVENTION

According to principles of the present invention in a preferred embodiment, a system and method produce a combined page having all of the composition of a first page plus all of the composition of a second page. The first page is received and divided into bands. Each band is rasterized if it is not already rasterized. After each band is rasterized, the raster image is saved to a solitary band store. The next page is then received and divided into bands. Each of the bands of the second page corresponds to one of the solitary band stores from the first page. Each of the bands of the second page is rendered into the corresponding band store from the first page to create combined band stores. Each of the combined band stores is then printed to produce the combined page.

According to further principles of the present invention in a preferred embodiment, the display list of the first page is preserved as the first page is divided into bands and rasterized. The first page is printed from the display list after each band of the first page has been rasterized and saved to a solitary band store.

Other objects, advantages, and capabilities of the present invention will become more apparent as the description proceeds.

DETAILED DESCRIPTION OF THE INVENTION

Figure 1:
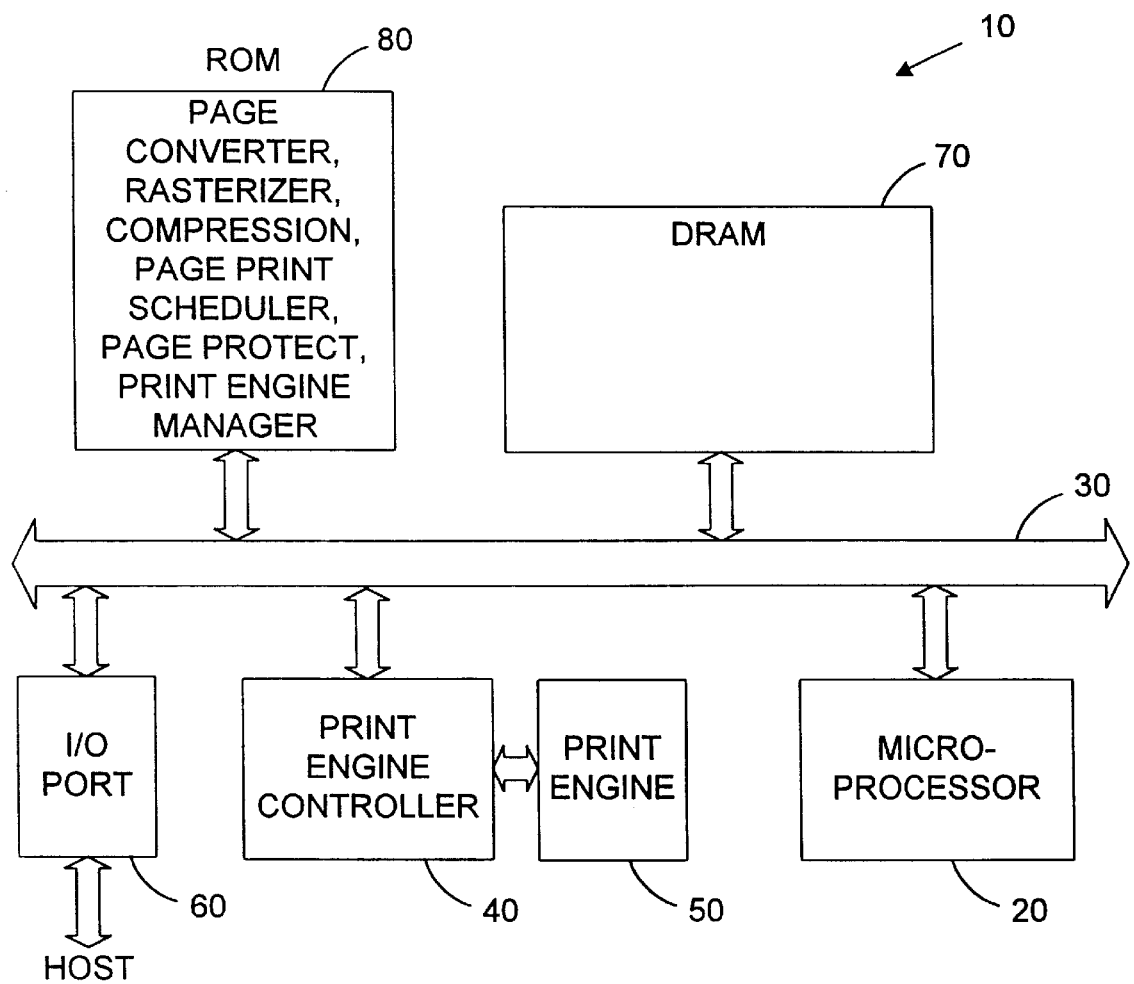
FIG. 1 is a block diagram of a page printer embodying the present invention system and method for printing a combined page.

FIG. 1 is a high-level block diagram of a page printer 10 incorporating the present invention for producing a combined page. Page printer 10 is controlled by a microprocessor 20 which communicates with other elements of the system via bus 30. A print engine controller 40 and associated print engine 50 connected to bus 30 provide the print output capability for page printer 10. Print engine 50 is preferably a laser printer that employs an electrophotographic drum imaging system, as well known in the art.

An input/output (I/O) port 60 provides communications between the page printer and a host computer and receives page descriptions from the host for processing within the page printer. A dynamic random access memory (DRAM) 70 provides a main memory for page printer 10.

A read only memory (ROM) 80 holds firmware which controls the operation of microprocessor 20 and page printer 10. The code procedures stored in ROM 80 may include the following: a page converter, rasterizer, compression code, page print scheduler (including a page protect feature) and print engine manager. The page converter firmware converts a page description received from the host to a display command list. Each display command defines an object to be printed on the page. The rasterizer firmware converts each display command to an appropriate bit map (rasterized band or strip) and distributes the bit map into memory 70. The compression firmware compresses the rasterized bands if there is insufficient memory in memory 70 for holding the rasterized bands.

When a page is closed for processing (i.e., all bands have been evaluated, rasterized, compressed, etc. for processing by print engine 50) then the rasterized bands are stored in DRAM 70 and subsequently passed to print engine 50 by print engine controller 40, thereby enabling the generation of an image (i.e., text/graphics etc.). The page print scheduler controls the sequencing and transferring of page bands to print engine controller 40. The print engine manager controls the operation of print engine controller 40 and, in turn, print engine 50.

The operation of page printer 10 commences when it receives a page description from a host computer via I/O port 60. The page description is placed in DRAM 70. Microprocessor 20 accesses the page description, line by line, and builds a display command list using the page converter firmware in ROM 80. The display command list is a set of commands that describe what must be printed and forms an intermediate description of the page. As the display command list is being produced, the display commands are sorted by location on the page and allocated to page bands. Each page band is subsequently converted to and stored as a rasterized bit map in DRAM 70 for use by print engine 50.

Figure 2:
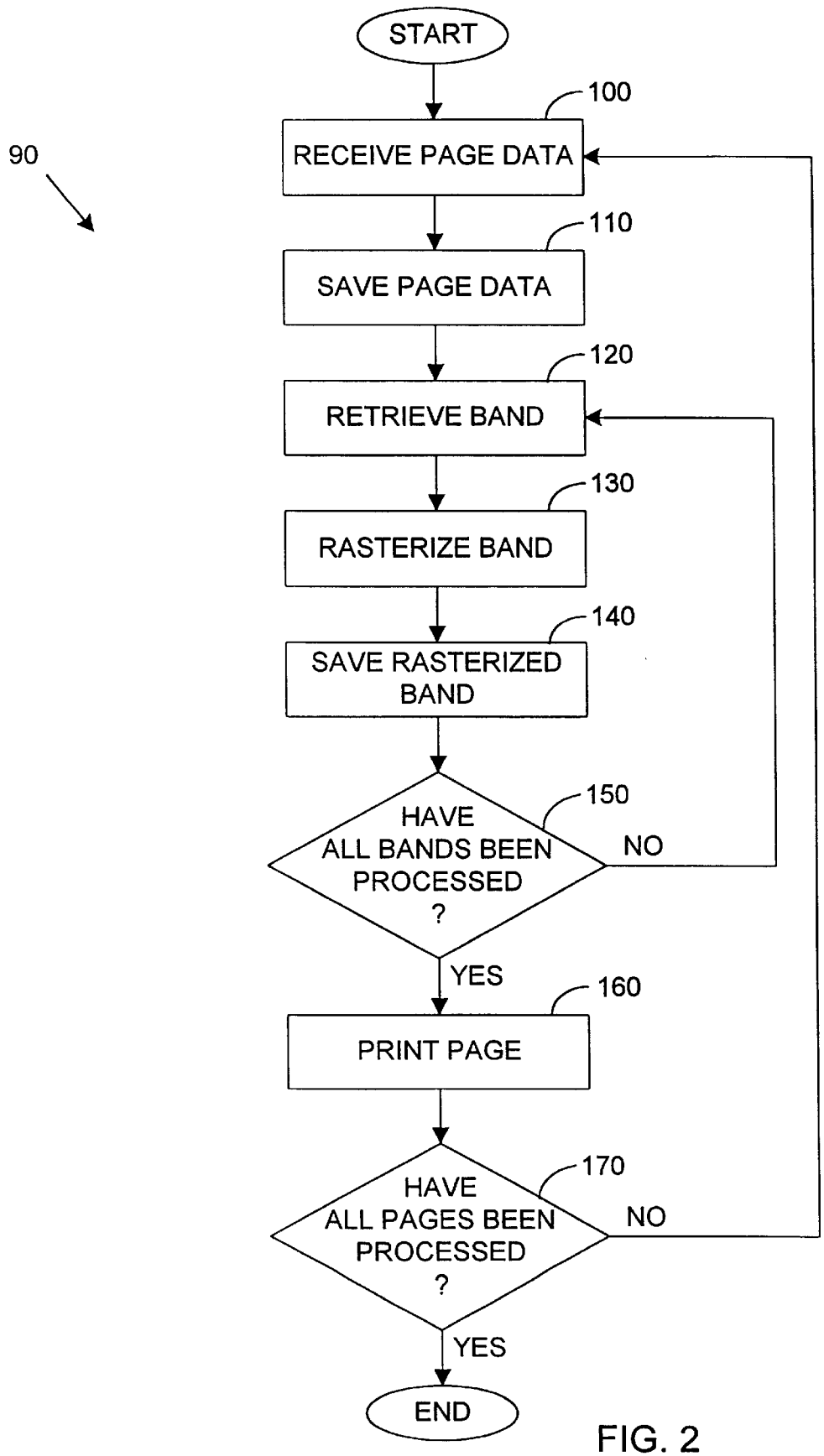
FIG. 2 is a flow chart showing a preferred embodiment of the present invention method for printing combined pages.

FIG. 2 shows a preferred embodiment for the present invention method 90 for printing a combined page having all of the composition of a first page plus all of the composition of a second page. Page data is received 100 from microprocessor 20 and saved 110 into a location in DRAM 70. A band of the page is then retrieved 120 from DRAM 70 and rasterized 130 by the firmware in ROM 80. The display list is preserved as the band is rasterized. The rasterized band is then saved 140 to a location in DRAM 70 as a solitary page store. A page store is a structure which holds all of the information and data concerning a page band.

After saving 140 the rasterized band, a determination is made 150 whether all of the bands of the page stored in DRAM 70 have been processed. If not all of the bands have been processed, the next band is retrieved 120 from the page data stored in DRAM 70. The process repeats until all of the bands of the first page have been processed. While repeating the process, each band store is saved to a different location in DRAM 70.

After all of the bands of the first page have been rasterized 130 and saved 140, the first page is printed 160 using the preserved display list. A determination is then made 170 whether all of the pages have been processed. If not all of the pages have been processed, the next page of data is received 100 and saved 110 to a location in DRAM 70.

A band is next retrieved 120 from the most recent page data stored in DRAM 70. The band is combined with a corresponding solitary page store from the previous page by rasterizing 130 the band and saving 140 the rasterized band into the solitary page store. Each band has a predetermined location on the page to be printed. Each band store created from a band has the same page location as the band from which it was created. A band corresponds to a band store from the previous page when the band has the same page location as the band store.

Saving 140 the band to the corresponding band store does not replace the contents of the band store. Instead, the band store becomes a combined band store containing all of the composition of the first page band plus all of the composition of the second page band.

All bands of the most recent page are processed according to this method. Once all bands have been processed, the page is printed by printing each of the combined band stores. The process repeats until all of the pages included in the copypage command have been processed.

Figure 3:
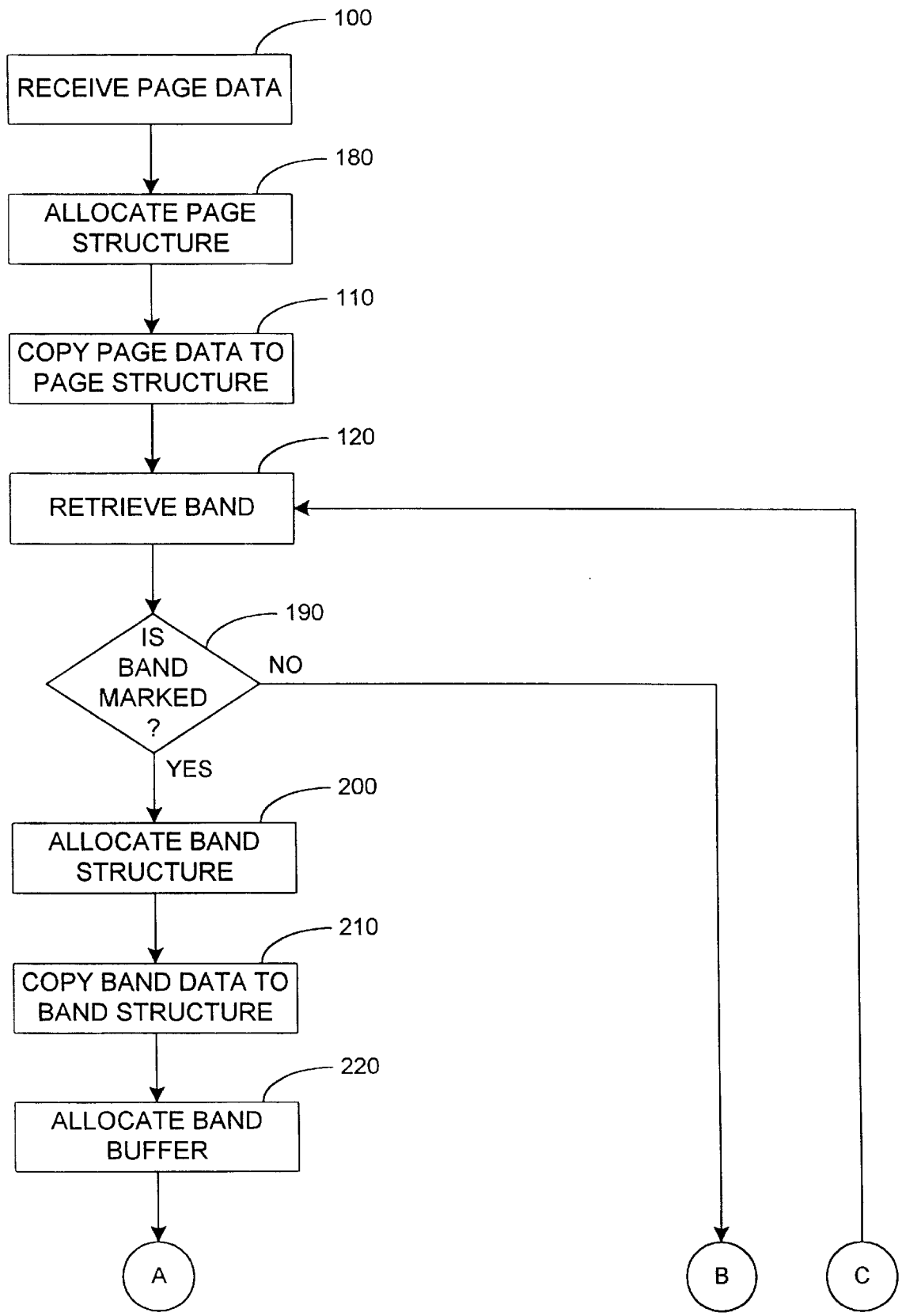
FIGS. 3 and 4 are a flow chart showing a preferred embodiment of a method for processing a first page employing the present invention.
Figure 4:
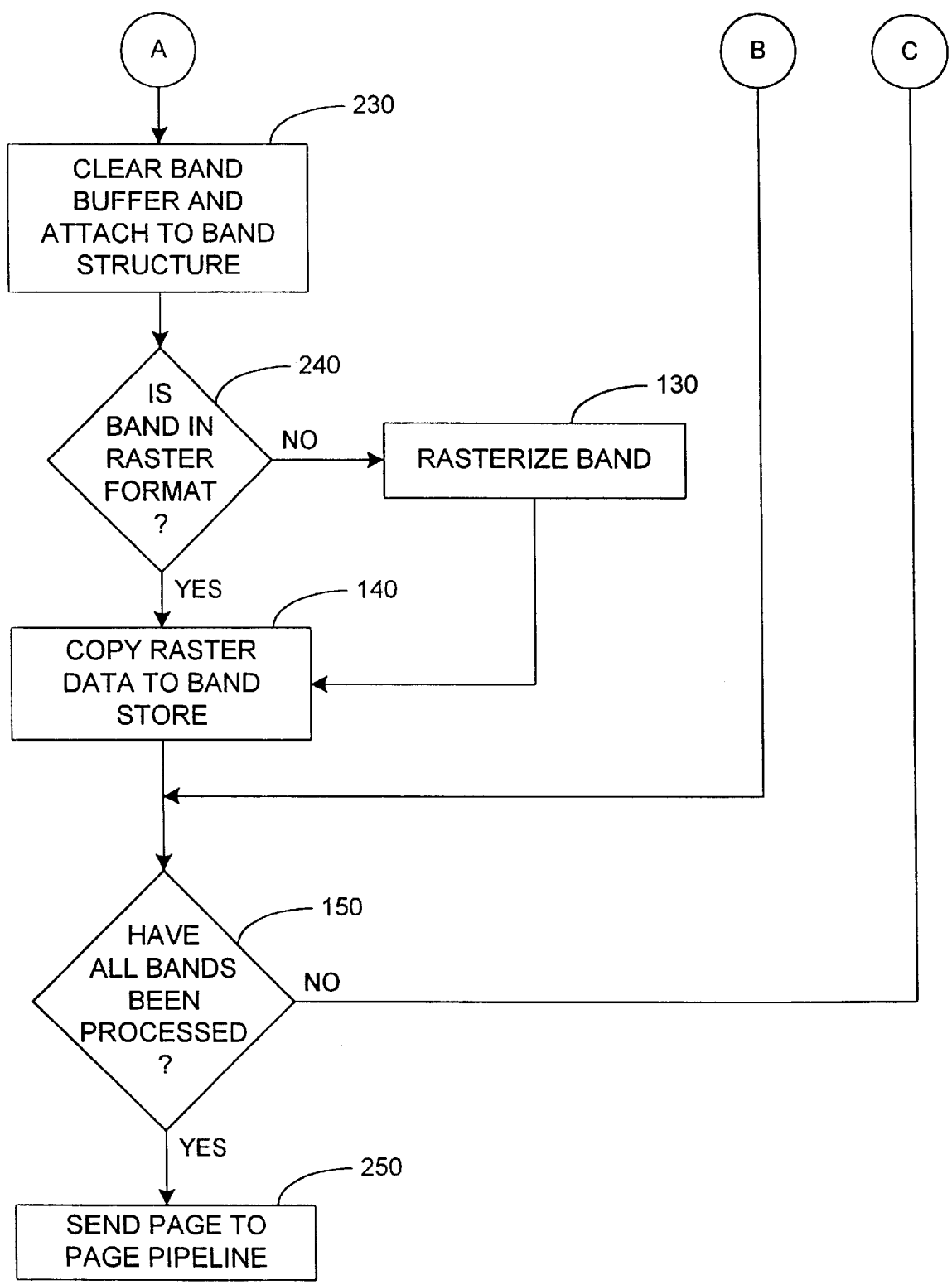

FIGS. 3 and 4 show in more detail the method for processing the first page of the copypage command. Steps with the same function as those in FIG. 2 are labeled the same in FIGS. 3 and 4. Page data is received 100 from microprocessor 20. Next, a page structure is allocated 180 in DRAM 70. Preferably, if there is not enough unused memory in DRAM 70 to allocate a page structure, the data in DRAM 70 is compressed to make more room in DRAM 70. The page data is then copied 110 into the page structure in DRAM 70. A band of the page is then retrieved 120 from DRAM 70. If 190 the retrieved band is not marked, no processing is required and a check is made to determine 150 whether all bands have been processed. A band is marked if it contains some data to be printed onto a page.

If 190 the retrieved band is marked, a band structure is allocated 200 in DRAM 70. Preferably, if there is not enough unused memory in DRAM 70 to allocate a band structure, the data in DRAM 70 is compressed to make more room in DRAM 70. Band data is then copied 210 to the band structure. The band data includes information about the band such as a pointer to its location in DRAM 70, the size of the band, and the location of the band on the page.

A band buffer is then allocated 220 in DRAM 70. Preferably, if there is not enough unused memory in DRAM 70 to allocate a band buffer, the data in DRAM 70 is compressed to make more room in DRAM 70. The band buffer is next cleared of any previous data and attached 230 to the band structure to create a band store. The band is then examined to determine 240 whether it is in raster format. If the band is in raster format, the band is copied 140 to the band store. If the band is not in raster format, the band is rasterized 130 and then stored 140 to the band store.

The page data is then examined to determine 150 whether all bands have been processed. If not all bands have been processed, the remaining bands are retrieved 120 and processed one at a time. Once all bands have been processed, the band stores are joined together to create a page. The page is transmitted 250 to the page pipeline where it will wait to be printed.

In summary, what has been described above are the preferred embodiments for a system and method for producing a combined page having all of the composition of a first page plus all of the composition of a second page. While the present invention has been described by reference to specific embodiments, it will be obvious that other alternative embodiments and methods of implementation or modification may be employed without departing from the true spirit and scope of the invention.

What is claimed is:

1. A method for producing a combined page having all of the composition of a first page plus all of the composition of a second page, the method comprising:

(a) rasterizing the first page into at least one raster image;

(b) allocating a structure for each raster image;

(c) copying band data from the first page to the structure;

(d) allocating a buffer for each raster image;

(e) attaching the buffer for each raster image to the structure for the raster image to create a store for the raster image;

(f) saving each raster image to the store for the raster image;

(g) rasterizing the second page into at least one raster image; and, (h) combining the at least one raster image from the first page with the at least one raster image from the second page to create the combined page.

2. The method of claim 1 wherein rasterizing the first page includes:

(a) determining whether each portion of the first page is rasterized; and, (b) rasterizing each portion of the first page which is not rasterized.

3. The method of claim 1 wherein allocating a structure and allocating a buffer includes:

(a) determining whether sufficient memory is available for allocating; and, (b) upon a determination of insufficient memory, compressing the at least one saved raster image.

4. The method of claim 3 wherein combining the at least one raster image from the first page with the at least one raster image from the second page includes:

(a) attaching the at least one compressed raster image to a display list; and, (b) adding the at least one raster image from the second page to the display list to create the combined page.

5. The method of claim 1 further including printing the combined page.

6. The method of claim 1 further including before (a):

(a) allocating a page structure; and, (b) saving the first page to the page structure.

7. The method of claim 1 further including between (a) and (b) printing the first page.

8. A system for producing a combined page having all of the composition of a first page plus all of the composition of a second page, the system comprising:

(a) means for dividing the first page into bands;

(b) means for rasterizing each band of the first page;

(c) means for saving the rasterized bands of the first page to solitary band stores;

(d) means for rendering objects from the second page into the same solitary band stores as the saved rasterized bands of the first page, to produce combined band stores; and (e) means for joining each combined band store to produce the combined page.

9. The system of claim 8 wherein the means for rasterizing each band of the first page includes:

(a) means for determining whether each band is rasterized; and, (b) means for rasterizing each band which is not rasterized.

10. The system of claim 8 wherein the means for saving the rasterized bands to solitary band stores includes:

(a) means for allocating a band structure;

(b) means for copying a band description from the first page to the band structure;

(c) means for allocating a band buffer;

(d) means for attaching the band buffer to the band structure to create a band store; and, (e) means for saving the rasterized band to the band store.

11. The system of claim 8 wherein the means for rendering objects from the second page into the solitary band stores includes:

(a) means for dividing the second page into bands, each band corresponding to one of the solitary band stores;

(b) means for attaching the corresponding band store to each band; and (c) means for rendering each object of each band of the second page into the attached band store.

12. The system of claim 8 wherein the means for joining each combined band store includes printing each band store.

13. The system of claim 8 further including:

(a) means for allocating a page structure; and, (b) means for saving the first page to the page structure.

14. The system of claim 8 further including means for printing the first page.

* * * * *